US010768575B2

(12) United States Patent
Chen et al.

(10) Patent No.: US 10,768,575 B2
(45) Date of Patent: Sep. 8, 2020

(54) IMAGING DEVICES AND IMAGING METHODS BY MILLIMETER WAVE 3D HOLOGRAPHIC SCANNING

(71) Applicant: Nuctech Company Limited, Beijing (CN)

(72) Inventors: Zhiqiang Chen, Beijing (CN); Yuanjing Li, Beijing (CN); Ziran Zhao, Beijing (CN); Wanlong Wu, Beijing (CN); Zongjun Shen, Beijing (CN); Li Zhang, Beijing (CN); Yinong Liu, Beijing (CN); Yingkang Jin, Beijing (CN); Wentao Yu, Beijing (CN)

(73) Assignee: Nuctech Company Limited, Beijing (CN)

( * ) Notice: Subject to any disclaimer, the term of this patent is extended or adjusted under 35 U.S.C. 154(b) by 202 days.

(21) Appl. No.: 15/562,627

(22) PCT Filed: Aug. 19, 2016

(86) PCT No.: PCT/CN2016/096024
§ 371 (c)(1),
(2) Date: Sep. 28, 2017

(87) PCT Pub. No.: WO2017/041618
PCT Pub. Date: Mar. 16, 2017

(65) Prior Publication Data
US 2018/0173161 A1 Jun. 21, 2018

(30) Foreign Application Priority Data
Sep. 9, 2015 (CN) .......................... 2015 1 0571357

(51) Int. Cl.
*G03H 1/26* (2006.01)
*G01S 13/89* (2006.01)
(Continued)

(52) U.S. Cl.
CPC .............. *G03H 1/268* (2013.01); *G01N 22/00* (2013.01); *G01S 13/89* (2013.01); *G01S 17/89* (2013.01);
(Continued)

(58) Field of Classification Search
CPC ........... G03H 1/268; G03H 2001/0428; G01N 22/00; G01S 13/89; G01S 17/89; G01V 8/005
(Continued)

(56) References Cited
U.S. PATENT DOCUMENTS 5,455,590 A * 10/1995 Collins ................. G01S 13/887
342/179
5,557,283 A * 9/1996 Sheen .................. G01S 13/887
342/179
(Continued)

FOREIGN PATENT DOCUMENTS

| CN | 1779442 A | 5/2006 |
|---|---|---|
| CN | 1864079 A | 11/2006 |

(Continued)

OTHER PUBLICATIONS

"International Application No. PCT/CN2016/096024, International Search Report dated Oct. 25, 2016", w/ English Translation, (Oct. 25, 2016), 8 pgs.
(Continued)

*Primary Examiner* — Collin X Beatty
(74) *Attorney, Agent, or Firm* — Schwegman Lundberg & Woessner, P.A.

(57) ABSTRACT

An imaging device and an imaging method by millimeter wave 3D holographic scanning are disclosed. In an embodiment, the millimeter wave 3D holographic scanning imaging device may include: a conveying apparatus configured to convey an object located thereon in a first direction; and at
(Continued)

least one millimeter wave transceiving module arranged beside the conveying apparatus, each configured to be enabled to scan the object when the conveying apparatus conveys the object through the respective millimeter wave transceiving module, wherein each millimeter wave transceiving module is arranged to have its longitudinal direction extend in a direction intersecting the first direction, and includes a millimeter wave transceiving antenna array for transceiving millimeter wave signals.

15 Claims, 3 Drawing Sheets

(51) Int. Cl.
    *G01N 22/00*      (2006.01)
    *G01V 8/00*      (2006.01)
    *G01S 17/89*      (2020.01)
    *G03H 1/04*      (2006.01)

(52) U.S. Cl.
    CPC ..... *G01V 8/005* (2013.01); *G03H 2001/0428* (2013.01)

(58) Field of Classification Search
    USPC .......................................................... 359/23
    See application file for complete search history.

(56) References Cited

U.S. PATENT DOCUMENTS

| | | | | |
|---|---|---|---|---|
| 5,689,239 A * | 11/1997 | Turner | ............... | G06K 7/082 235/383 |
| 6,988,660 B2 * | 1/2006 | Tsikos | ............... | G06K 9/26 235/454 |
| 7,034,746 B1 * | 4/2006 | McMakin | ............... | G01S 7/024 342/175 |
| 7,183,963 B2 * | 2/2007 | Lee | ............... | G01N 22/00 342/175 |
| 7,253,766 B2 * | 8/2007 | Foote | ............... | G01S 13/003 342/179 |
| 7,405,692 B2 * | 7/2008 | McMakin | ............... | G01S 7/20 342/22 |
| 7,986,260 B2 * | 7/2011 | McMakin | ............... | G01S 7/026 342/175 |
| 9,417,356 B2 * | 8/2016 | Chen | ............... | G01V 8/20 |
| 9,599,705 B2 * | 3/2017 | Wu | ............... | G01S 13/887 |
| 9,715,012 B2 * | 7/2017 | Fernandes | ............... | G01S 13/887 |
| 2002/0014533 A1 * | 2/2002 | Zhu | ............... | B82Y 15/00 235/472.01 |
| 2002/0043561 A1 * | 4/2002 | Tsikos | ............... | B82Y 15/00 235/454 |
| 2005/0232459 A1 * | 10/2005 | Rowe | ............... | G01S 13/86 382/100 |
| 2006/0109160 A1 * | 5/2006 | Baharav | ............... | G01S 13/89 342/22 |
| 2007/0205936 A1 * | 9/2007 | McMakin | ............... | G01S 7/026 342/22 |
| 2007/0263907 A1 * | 11/2007 | McMakin | ............... | G01S 13/887 382/115 |
| 2008/0100510 A1 * | 5/2008 | Bonthron | ............... | G01S 7/024 342/373 |
| 2008/0174476 A1 * | 7/2008 | Detlefsen | ............... | G01S 13/87 342/25 A |
| 2008/0272954 A1 * | 11/2008 | Bunch | ............... | G01S 13/88 342/22 |
| 2008/0316088 A1 * | 12/2008 | Pavlov | ............... | G01S 13/04 342/179 |
| 2011/0057827 A1 * | 3/2011 | Bunch | ............... | G01S 13/88 342/23 |
| 2011/0234443 A1 * | 9/2011 | Nakasha | ............... | G01S 7/292 342/21 |
| 2012/0256796 A1 * | 10/2012 | Leiba | ............... | H01Q 1/2283 343/702 |
| 2014/0028837 A1 * | 1/2014 | Gao | ............... | G06K 7/10792 348/136 |
| 2014/0091965 A1 * | 4/2014 | Sheen | ............... | G01S 13/90 342/25 A |
| 2015/0048251 A1 | 2/2015 | Chen et al. | | |
| 2015/0048964 A1 | 2/2015 | Chen et al. | | |
| 2019/0347454 A1 * | 11/2019 | Mongrenier | ......... | G05B 19/042 |

FOREIGN PATENT DOCUMENTS

| | | |
|---|---|---|
| CN | 101614722 A | 12/2009 |
| CN | 103033522 A | 4/2013 |
| CN | 103698762 A | 4/2014 |
| CN | 203881311 U | 10/2014 |
| CN | 104375141 A | 2/2015 |
| CN | 105068069 A | 11/2015 |
| CN | 204925386 U | 12/2015 |
| WO | WO-2014173831 A2 | 10/2014 |

OTHER PUBLICATIONS

"International Application No. PCT/CN2016/096024, Written Opinion dated Oct. 25, 2016", (Oct. 25, 2016), 4 pgs.
"European Application Serial No. 16843556.8 Extended European Search Report dated Aug. 17, 2018", (Aug. 17, 2018), 8 pgs.

* cited by examiner

IMAGING DEVICES AND IMAGING METHODS BY MILLIMETER WAVE 3D HOLOGRAPHIC SCANNING

CROSS-REFERENCE TO RELATED APPLICATION(S)

This application is a U.S. National Stage Filing under 35 U.S.C. 371 from International Application No. PCT/CN2016/096024, filed on Aug. 19, 2016, and published as WO2017/041618 on Mar. 16, 2017, which claims priority to Chinese application No. 201510571357.X, filed on Sep. 9, 2015, entitled "IMAGING DEVICES AND IMAGING METHODS BY MILLIMETER WAVE 3D HOLOGRAPHIC SCANNING", which applications and publication are incorporated herein by reference in their entirety.

TECHNICAL FIELD

The present disclosure relates to the field of security inspection techniques, and more particularly to imaging devices and imaging methods by millimeter wave 3D (three-dimension) holographic scanning.

BACKGROUND

Currently the most widely used imaging security inspection technology includes mainly an X-ray imaging technology and a millimeter wave imaging technology. The millimeter wave imaging technology is increasingly being recognized by the market. The millimeter wave imaging technology is mainly divided into a passive millimeter wave imaging technology and an active millimeter wave imaging technology, and the active millimeter wave imaging technology mainly refers to a holographic imaging technology.

In the existing active millimeter wave 3D holographic imaging technology used in the security inspection, it is required that an object to be inspected, such as a human body or an article, stays in a specific location for a while. Thus, the inspection cannot be performed continuously, and a clearance rate is lower. In addition, since there is a moving part, a larger space is occupied.

In view of this, it is necessary to provide novel imaging devices and imaging methods by millimeter wave 3D holographic scanning.

SUMMARY

Objects of the present disclosure partly consist in providing imaging devices and imaging methods by millimeter wave 3D holographic scanning, which can improve the clearance rate and implement a compact structure.

According to an aspect of the present disclosure, an imaging device by millimeter wave 3D holographic scanning is provided, comprising: a conveying apparatus configured to convey an object located thereon in a first direction; and at least one millimeter wave transceiving module arranged beside the conveying apparatus, each configured to be enabled to scan the object when the conveying apparatus conveys the object through the respective millimeter wave transceiving module, wherein each millimeter wave transceiving module is arranged to have its longitudinal direction extend in a direction intersecting the first direction, and comprises a millimeter wave transceiving antenna array for transmitting and receiving millimeter wave signals.

According to another aspect of the present disclosure, an imaging method of performing millimeter wave 3D holographic scanning on an object to be inspected is provided, comprising: conveying the object in a first direction by a conveying apparatus, so that the object passes through at least one millimeter wave transceiving module, wherein each millimeter wave transceiving module is arranged to have its longitudinal direction extend in a direction intersecting the first direction, and comprises a millimeter wave transceiving antenna array for transmitting and receiving millimeter wave signals; scanning the object by each millimeter wave transceiving module when the object passes through the millimeter wave transceiving module, so as to obtain scanned data of the object; and obtaining a millimeter wave holographic image of the object based on the scanned data.

According to the embodiments of the present disclosure, the scanning of the object is done when the object is conveyed through the millimeter wave transceiving module, so that the object is not required to stay. Therefore, the object to be inspected may be passed through continuously with a higher clearance rate. It is especially useful for massive passenger flow occasions, such as customs, subway stations etc.

In addition, a longitudinal direction of the millimeter wave transceiving module may extend in a direction (for example, a substantially vertical direction) intersecting a traveling direction of the object (usually in a substantially horizontal direction), so that the millimeter wave transceiving module may be manufactured into a columnar shape, which occupies a smaller area, and may be used in more occasions, especially occasions where the area is the most important. In addition, since there may not be a moving part, a further compact structure may be realized.

BRIEF DESCRIPTION OF THE DRAWINGS

In order to better understand the present disclosure, embodiments of the present disclosure will be described according to the accompanying drawings, in which FIG. 1 schematically shows a perspective view of an imaging device by millimeter wave 3D holographic scanning according to an exemplary embodiment of the present disclosure.

DETAILED DESCRIPTION

Figure 1:
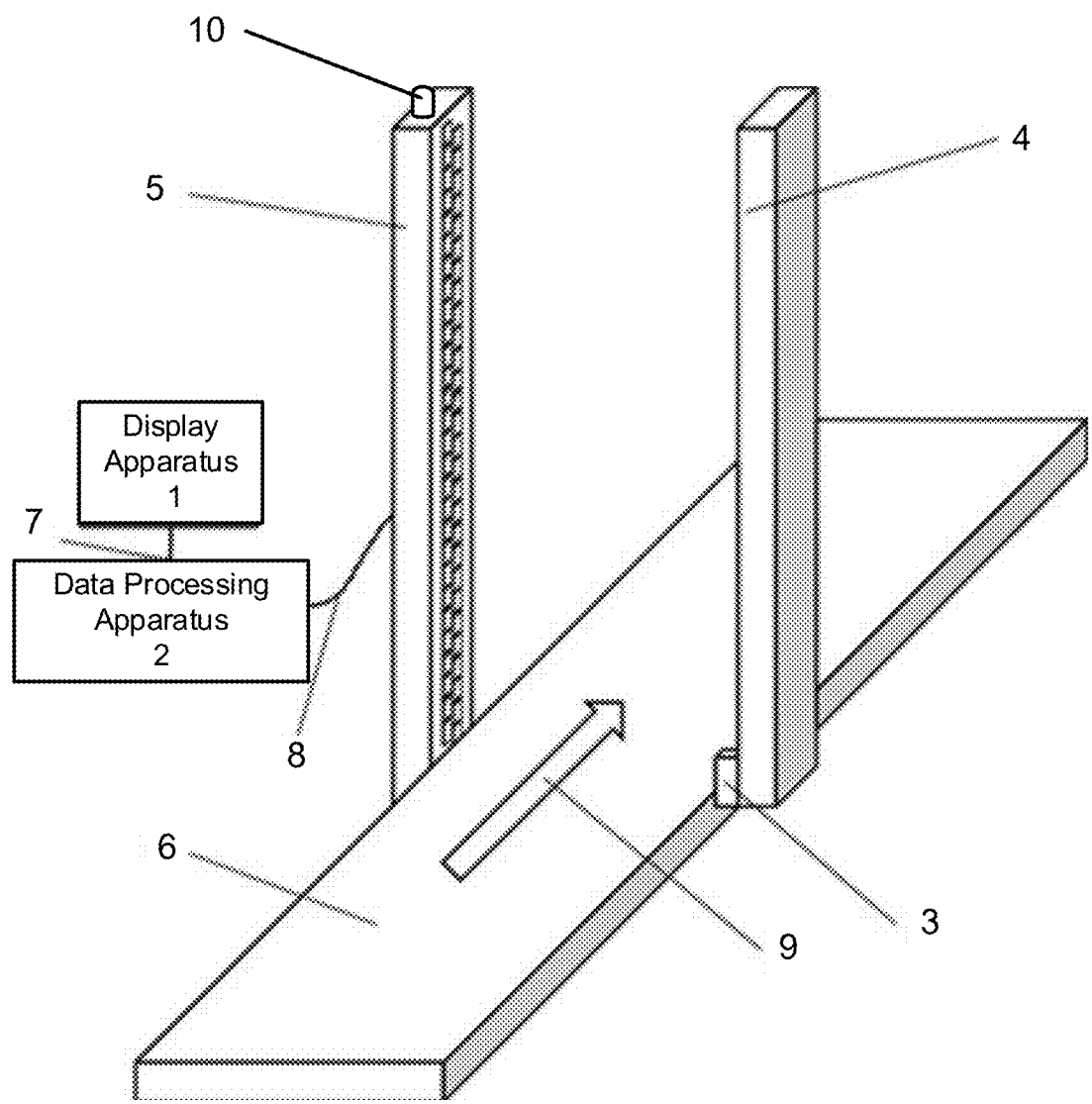

Hereinafter, embodiments of the present disclosure will be described with reference to the accompanying drawings. It is to be understood that such description is exemplary only but is not intended to limit the scope of the present disclosure. In addition, in the following description, descriptions of well-known structures and techniques are omitted to avoid unnecessarily obscuring the concepts of the present disclosure.

The terms used herein is for the purpose of describing particular embodiments only, but is not intended to limit the present disclosure. The words "a", "an" and "the" as used herein should also cover the meanings of "a plurality of", "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

All terms (including technical and scientific terms) used herein have the same meanings as commonly understood by the skilled in the art, unless defined otherwise. It should be noted that the terms used herein should be construed to have the same meanings as the context of the present specification and should not be interpreted in an idealized or overly stereotyped manner.

Some block diagrams and/or flowcharts are shown in the accompanying drawings. It should be understood that some of blocks or combinations thereof in the block diagrams and/or flowcharts may be implemented by computer program instructions. The computer program instructions may be provided to a general purpose computer, a dedicated computer, or processors of other programmable data processing apparatus, so that the instructions, when being executed by the processor, may create means for implementing the functions/operations as described in the block diagrams and/or flowcharts.

Thus, the techniques of the present disclosure may be implemented in forms of hardware and/or software (including firmware, microcode, etc.). In addition, the techniques of the present disclosure may be embodied in a form of a computer program product on a computer readable medium storing instructions. The computer program product may be used by an instruction execution system or in conjunction with an instruction execution system. In the context of the present disclosure, the computer readable medium may be any medium capable of containing, storing, transmitting, propagating, or transmitting instructions. For example, the computer readable media may include, but are not limited to, electrical, magnetic, optical, electromagnetic, infrared or semiconductor systems, apparatuses, devices, or propagation media. Particular examples of the computer readable media may include a magnetic storage device, such as a magnetic tape or a hard drive disk (HDD); an optical storage device, such as an optical disk (CD-ROM); a memory, such as a random access memory (RAM) or a flash memory; and/or a wired/wireless communication link.

FIG. 1 schematically shows a perspective view of an imaging device by millimeter wave 3D holographic scanning according to an exemplary embodiment of the present disclosure.

As shown in FIG. 1, the imaging device by millimeter wave 3D holographic scanning may include a conveying apparatus 6 and at least one millimeter wave transceiving module (4, 5).

The conveying apparatus 6 is used for conveying an object (not shown, e.g., a human body or an article) located thereon in a first direction. In this example, the first direction is a direction indicated by an arrow 9 in FIG. 1. The conveying apparatus 6 may be implemented in a variety of forms, such as a conveyer belt or a roller etc.

Figure 2:
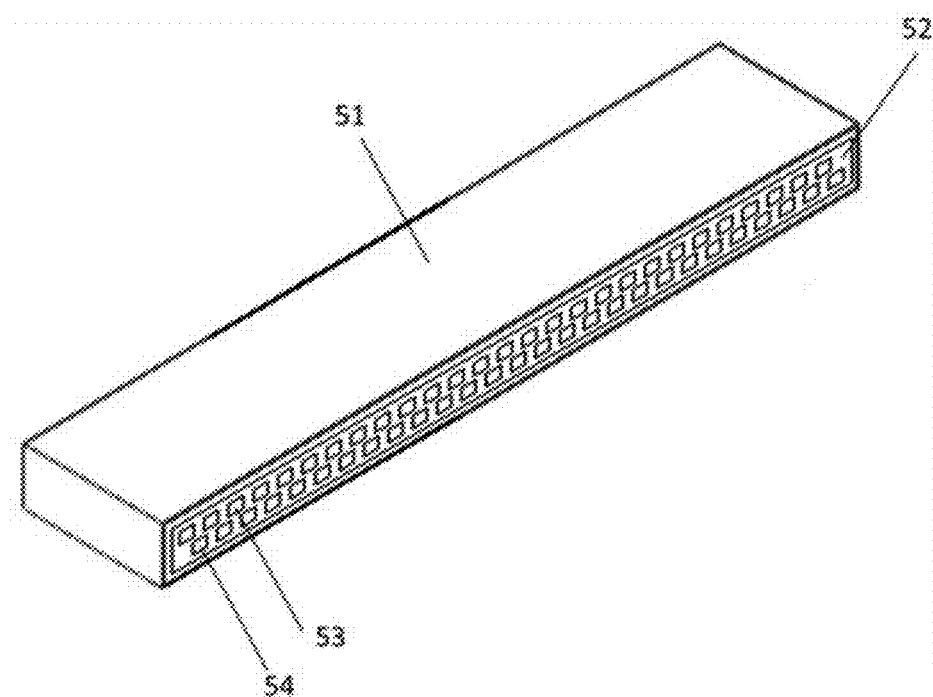
FIG. 2 schematically shows a perspective view of a millimeter wave transceiving module according to an embodiment of the present disclosure.

The millimeter wave transceiving module (4, 5) may include a millimeter wave transceiving antenna array 52 for transmitting and receiving millimeter wave signals, as shown in FIG. 2. The millimeter wave transceiving antenna array 52 may include a plurality of millimeter wave transmitting antennas 53 and a plurality of millimeter wave receiving antennas 54. In the example of FIG. 2, the plurality of millimeter wave transmitting antennas 53 are shown as a column (linear array), and the plurality of millimeter wave receiving antennas 54 are shown in a column, the two columns being arranged in parallel. And there may be a certain offset in position between the millimeter wave transmitting antennas 53 and the millimeter wave receiving antennas 54. Such an arrangement of a linear array for the antenna array facilitates to achieve a compact structure.

However, the arrangement of the millimeter wave transceiving antenna array 52 is not limited thereto. The millimeter wave transceiving antenna array 52 may be arranged differently depending on design requirements. For example, in the millimeter wave transceiving antenna array 52, the column of the millimeter wave transmitting antennas 53 and the column of the millimeter wave receiving antennas 54 may be alternately arranged, or a plurality of millimeter wave transmitting antennas 53 may be arranged in one region while a plurality of millimeter wave transmitting antenna 53 may be arranged in another region, etc. Respective columns of antennas may be arranged in parallel, and the antennas in adjacent columns do not have to be fully aligned.

A transmission plane and a reception plane of the millimeter wave transceiving antenna array 52 may be in substantially the same plane, so that the millimeter wave transceiving module (4, 5) may perform planar scanning, instead of cylindrical scanning. Compared to the cylindrical scanning, the millimeter wave holography imaging algorithm required for the planar scanning is simpler and more accurate.

The millimeter wave transceiving module (4, 5) may further include a millimeter wave transceiving circuit 51 connected to and cooperating with the millimeter wave transceiving antenna array 52. Specifically, the millimeter wave transceiving circuit 51 may be arranged in the millimeter wave transceiving module (4, 5) and in the rear of the millimeter wave transceiving antenna array 52. It may be understood that the millimeter wave transceiving circuit 51 may be arranged at an arbitrary position, e.g., on or under or on a left side or on a right side of the millimeter wave transceiving module (4, 5), as long as it may be ensured that the millimeter wave transceiving circuit 51 does not block the transmission and the reception of the millimeter wave.

The millimeter wave transceiving module (4, 5) is arranged beside the conveying apparatus 6, so that each millimeter wave transceiving module may scan the object when the conveying apparatus conveys the object through the corresponding millimeter wave transceiving module. Here, the millimeter wave transceiving module (4, 5) is arranged to face the conveying apparatus 6, so that its effective operating range can cover a certain area on the conveying apparatus. Thus, when the object is conveyed through the millimeter wave transceiving module (4, 5) by the conveying apparatus 6, the millimeter wave transmitted by the millimeter wave transceiving module (4, 5) may be incident on the object, and the millimeter wave reflected or scattered from the object may be received by the millimeter wave transceiving module (4, 5). According to the millimeter wave reflected or scattered from the object, the scanned data of the object may be obtained, and a millimeter wave holographic image of the object may be obtained based on the scanned data.

The millimeter wave transceiving module (4, 5) is arranged to have its longitudinal direction extend in a second direction intersecting with (e.g., being perpendicular to) the first direction. In a normal security inspection situation, the human body or the article conveying direction (i.e., the first direction) may be a substantially horizontal direction, and at this time, the longitudinal direction of the millimeter wave transceiving module (4, 5) may extend in a substantially vertical direction. Here, the term "longitudinal direction" refers to a direction of elongation of the millimeter wave transceiving module (4, 5). Normally, the longitudinal direction of the millimeter wave transceiving module (4, 5) corresponds to a direction in which the millimeter wave transceiving antenna array included in the module can scan by switching the transmitting/receiving antenna(s), as will be described further below. In general, the millimeter wave transceiving module (4, 5) is elongated in the scanning direction, so that the dimension of the millimeter wave transceiving module (4, 5) in this direction is referred to as a "length", and thus this direction is referred to as the "longitudinal direction". For example, in the case of a linear array, the longitudinal direction may be the direction of the column of the millimeter wave transmitting antennas 53 and/or the direction of the column of the millimeter wave receiving antennas 54.

In the example of FIG. 1, two millimeter wave transceiving modules 4 and 5 are shown. The two millimeter wave transceiving modules 4 and 5 are arranged on opposite sides of the conveying apparatus 6, respectively. In this way, they may scan different sides (e.g., left and right sides in FIG. 1) of the object on the conveying apparatus 6, respectively. This can significantly improve inspection efficiency.

It should be noted that although the case where the millimeter wave transceiving module 4 and the millimeter wave transceiving module 5 are arranged opposite to each other is shown in FIG. 1, the present disclosure is not limited thereto. For example, the millimeter wave transceiving module 4 and the millimeter wave transceiving module 5 may be spaced apart by a certain distance in the first direction (the direction indicated by the arrow 9 in FIG. 1). In another example, if a better image effect is expected to be obtained from some particular orientation (e.g., an oblique anterior position or an oblique posterior position, etc. of the object), the millimeter wave transceiving module 4 and/or the millimeter wave transceiving module 5 may not be arranged to be right face the conveying apparatus 6, but oblique to the conveying apparatus 6. Also, the millimeter wave transceiving module 4 and the millimeter wave transceiving module 5 are not limited to extending in the same direction, but may extend in different directions, i.e., may have a plurality of different second directions.

The present disclosure is not limited to provide two millimeter wave transceiving modules, but may provide a single or three or even more millimeter wave transceiving modules. In a case of a single millimeter wave transceiving module being provided, the object may be scanned unilaterally, or the object may be flipped during the scanning process to achieve bilateral scanning; while in a case of setting three or more millimeter wave transceiving modules, the object may be scanned from more sides and/or more angles.

It may be understood that for the millimeter-wave 3D holographic imaging, the scanning can have three dimensions, such as two dimensions in space and a dimension on frequency. The two dimensions in space may be scanning in the first direction which may be implemented by conveying of the conveying apparatus 6 and scanning in the second direction which may be implemented by switching the current transmitting antenna(s) and/or the current receiving antenna(s), respectively. In addition, the scanning on the frequency dimension may be achieved by changing the frequency of the transmitted and received millimeter wave.

In a case that the longitudinal directions of the millimeter wave transceiving module 4 and the millimeter wave transceiving module 5 extend in the same direction, their respective scanning directions are the same (i.e., the same second direction). In this case, for example, it is easy to acquire images of the same part of the object from different angles in a most timely manner. In a case that the longitudinal directions of the millimeter wave transceiving module 4 and the millimeter wave transceiving module 5 extend in different directions, their respective scanning directions are different (i.e., there are different second directions). This may cause that they are not in positions right facing to each other during the scanning process, and thus may reduce interference between the first millimeter wave transceiving module 4 and the millimeter wave transceiving module 5.

In addition, the scanning of the millimeter wave transceiving module 4 and the millimeter wave transceiving module 5 in their respective second directions may be performed synchronously, so as to present the 3D holographic image in synchronization. Alternatively, the scanning of the millimeter wave transceiving module 4 and the millimeter wave transceiving module 5 in their respective second directions may be performed asynchronously, since different sides of the object may have different scanning requirements. For example, some side or part of the object may require finer scanning, while other parts of the object may require only relatively coarse scanning. In this case, the millimeter wave transceiving module 4 and the millimeter wave transceiving module 5 may use asynchronous separate control. Likewise, the millimeter wave transceiving module 4 and the millimeter wave transceiving module 5 may also have different scanning rates to accommodate different scanning requirements. The scanning rates of the millimeter wave transceiving module 4 and the millimeter wave transceiving module 5 may even be continuously changing or intermittently changing.

During the scanning process, the movement of the conveying apparatus 6 may be intermittent or continuous movement in the first direction.

In one implementation, during the scanning process, the conveying apparatus 6 is intermittently moved. For the same position of the object, the scanning in two dimensions is performed on the object by changing the frequency of the transmitted millimeter wave, changing the current transmitting antenna and/or the receiving antenna in the millimeter wave transceiving module (4, 5). The scanning in two dimensions combines with the intermittent movement of the conveying apparatus 6 to obtain complete scanned data in three dimensions.

In another implementation, during the scanning process, the conveying apparatus 6 continuously moves or continues to move. The scanning in three dimensions is performed on the object by changing the frequency of the transmitted millimeter wave, changing the current transmitting antenna and/or the receiving antenna in the millimeter wave transceiving module (4, 5), while the conveying apparatus 6 is moving, so as to obtain complete scanned data in three dimensions.

As such, the millimeter wave transceiving module (4, 5) may be fixed during the scanning process. Therefore, it is not necessary to provide a moving component in the millimeter wave transceiving module (4, 5), so that a compact structure may be achieved.

Of course, the millimeter wave transceiving module (4, 5) may also include a position adjusting mechanism, e.g., arranged in its base, so that the orientation and the angle of the millimeter wave transceiving module (4, 5) may be adjusted relative to the conveying apparatus 6. Thus, the scanning direction may be adjusted as needed, which cannot be achieved by the cylinder scanning.

In an example, the millimeter wave 3D holographic scanning imaging device may further include a data processing apparatus 2. The data processing apparatus 2 is connected to the millimeter wave transceiving module (4, 5) in a wireless or a wired connection, e.g., via a conductor 8, to receive the scanned data from the millimeter wave transceiving module (4, 5) and generate the millimeter wave hologram. During the scanning process, the millimeter wave transceiving module (4, 5) may transmit the obtained scanned data to the data processing apparatus 2 in real time, or may transmit the obtained scanned data to the data processing apparatus 2 in segments after being buffered, or may transmit the obtained scanned data to the data processing apparatus 2 in one time after being buffered. The data processing apparatus 2 may, after receiving all the scanned data, obtain the millimeter wave holographic image by processing; or may process immediately after parts of data are received.

The millimeter wave 3D holographic scanning imaging device may further include a display apparatus 1. The display apparatus 1 is connected to the data processing apparatus 2 in a wireless or a wired connection, e.g., via a conductor 7, for receiving and displaying the millimeter wave holographic image from the data processing apparatus 2.

Alternatively, the data processing apparatus 2 may perform automatic suspect object recognition on the generated millimeter wave hologram, and transmit the recognition result to the display apparatus 1, so that the display apparatus 1 may display the millimeter wave holographic image and the suspect recognition result. In a case that the suspect is recognized, it is also possible to display an approximate position of the recognized suspect on the millimeter wave holographic image.

In an example, the data processing apparatus 2 may generate a control signal, and send the control signal to the conveying apparatus 6, so that the conveying apparatus 6 conveys the object in a controlled manner, e.g., at a constant rate; in continuous movement or intermittent movement, etc. In another example, the millimeter wave 3D holographic scanning imaging device may also include a control apparatus (not shown) independent of the data processing apparatus 2 for generating the control signal and transmitting the control signal to the conveying apparatus 6 so that the conveying apparatus 6 performs the scanning movement in a controlled manner.

In an example, the data processing apparatus 2 may generate a control signal, and send the control signal to the millimeter wave transceiving module (4, 5), so that the millimeter wave transceiving module (4, 5) may switch between the transmitting/receiving antennas and/or between the frequencies in a controlled manner. In another example, the millimeter wave 3D holographic scanning imaging device may also include a control apparatus (not shown) independent of the data processing means 2 for controlling the signal and transmitting the control signal to the millimeter wave transceiving module (4, 5). The control apparatus may be incorporated in the millimeter wave transceiving module (4, 5), e.g., in the millimeter wave transceiving circuit 51.

In order to reduce the interference between the millimeter wave transceiving module 4 and the millimeter wave transceiving module 5, the millimeter wave transceiving module 4 and the millimeter wave transceiving module 5 may use different frequencies. In addition, the time when the millimeter wave transceiving antenna array in the millimeter wave transceiving module 4 transmits the millimeter wave may be different from the time when the millimeter wave transceiving antenna array in the millimeter wave transceiving module 5 transmits the millimeter wave, so that the interference between the millimeter wave transceiving module 4 and the millimeter wave transceiving module 5 may further be reduced.

In an example, the imaging device by millimeter wave 3D holographic scanning may further include a position sensor 3 for sensing the position of the object on the conveying apparatus 6, in particular the distance between the object and the millimeter wave transceiving module (4, 5). For example, the position sensor 3 may be arranged on the corresponding millimeter wave transceiving module (4, 5). When the object is being conveyed on the conveying apparatus 6, as the object approaches the millimeter wave transceiving module (4, 5), when it is determined based on the sensing result of the position sensor 3 that the distance of the object toward the millimeter wave transceiving module (4, 5) is less than a predetermined value, an indication may be issued, e.g., by an indicating apparatus 10 to alert the object (particularly the person) being detected to keep stationary, so that the millimeter wave transceiving module (4, 5) may image better. In addition, as the object is being conveyed apart from the millimeter wave transceiving module (4, 5), when it is determined based on the sensing result of the position sensor 3 that the distance of the object apart from the millimeter wave transceiving module (4, 5) is more than a predetermined value, an indication may be issued, e.g., by the indicating apparatus 10 to alert the object (particularly the person) being detected to be free to move. If necessary, a standing direction and posture of the person being detected may also be specified. The indicating apparatus 10 may be implemented as e.g. an indicator light capable of blinking.

In an example, the millimeter wave transceiving module (4, 5) need not always be in a working state, but may work only when the object is within a certain range of distance from the millimeter wave transceiving module (4, 5) (e.g., determined according to the sensing result of the position sensor 3), in order to save power.

Figure 3:
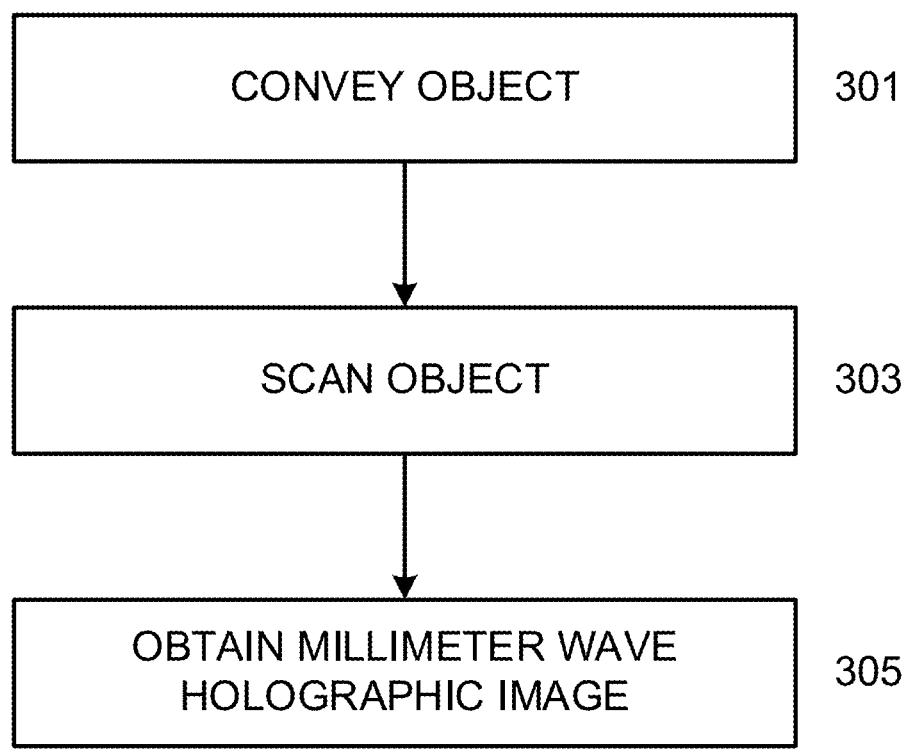
FIG. 3 schematically shows a flowchart of an imaging method by performing millimeter wave 3D holographic scanning on an object to be inspected according to an embodiment of the present disclosure.

FIG. 3 schematically shows a flowchart of an imaging method of performing millimeter wave 3D holographic scanning on an object to be inspected according to an embodiment of the present disclosure.

As shown in FIG. 3, at Operation 301, the object is conveyed in the first direction using the conveying apparatus so that the object passes through at least one millimeter wave transceiving module. The conveying apparatus and the millimeter wave transceiving module are, e.g., the conveying apparatus 6 and the millimeter wave transceiving modules 4 and 5 as described above. In particular, the millimeter wave transceiving module is arranged to have its longitudinal direction extend in a direction intersecting the first direction and includes a millimeter wave transceiving antenna array for transmitting and receiving the millimeter wave signals.

Then, at Operation 303, each millimeter wave transceiving module scans the object when the object passes through the millimeter wave module, so as to obtain the scanned data of the object. Such scanning may be performed in a number of ways as described above.

Then, at Operation 305, the millimeter wave holographic image of the object is obtained based on the scanned data. The skilled in the art may know a variety of image reconstruction algorithms for reconstructing the millimeter wave holographic image of the object.

In addition, the position of the object on the conveying apparatus 6 may be sensed during convey of the object. According to the sensing result of the position sensor, an indication may be issued when it is determined that the distance of the object toward some millimeter wave transceiving module is less than a predetermined value, and an indication may be issued when it is determined that the distance of the object apart from the millimeter wave transceiving module is more than a predetermined value. In addition, as described above, the scanning process at Operation 303 may be performed when the object is sensed to be within a certain range of distance from the millimeter wave transceiving module.

According to the embodiments of the present disclosure, the millimeter wave 3D holographic imaging by the plane scanning may be realized. The device has a smaller volume, and may be manufactured into a columnar shape, which occupies a smaller area, and may be widely used in many occasions. The person being detected may pass continuously with a higher passing rate without any staying, and may be applied to human security inspection of massive passenger flow occasions, such as customs, subways etc.

The embodiments of the present disclosure have been described above. However, these embodiments are for illustrative purposes only, but are not intended to limit the scope of the present disclosure. Although the respective embodiments have been described above separately, it does not mean that the measures in the various embodiments cannot be advantageously used in combination. The scope of the present disclosure is defined by the appended claims and their equivalents. Various alternatives and modifications may be made by the skilled in the art without departing from the scope of the present disclosure, and such alternatives and modifications should fall into the scope of the present disclosure.

We claim:

1. An imaging device by millimeter wave three-dimension 3D holographic scanning, comprising:
  a conveying apparatus configured to convey an object located thereon in a first direction; and
  at least one millimeter wave transceiving module arranged beside the conveying apparatus, each configured to be enabled to scan the object when the conveying apparatus conveys the object through the respective millimeter wave transceiving module,
  wherein each millimeter wave transceiving module is arranged to have its longitudinal direction extend in a direction intersecting the first direction, and comprises a millimeter wave transceiving antenna array for transceiving millimeter wave signals,
  wherein the millimeter wave transceiving antenna array comprises a column of millimeter wave transmitting antennas and a column of millimeter wave receiving antennas, the two columns being arranged in parallel.

2. The imaging device by millimeter wave 3D holographic scanning according to claim 1, wherein the first direction is a substantially horizontal direction, and the millimeter wave transceiving module is arranged to have its longitudinal direction extend in a substantially vertical direction.

3. The imaging device by millimeter wave 3D holographic scanning according to claim 1, wherein the millimeter wave transceiving module is arranged to be fixed when the object is being scanned.

4. The imaging device by millimeter wave 3D holographic scanning according to claim 1, wherein the at least one millimeter wave transceiving module comprises a first millimeter wave transceiving module and a second millimeter wave transceiving module respectively arranged on opposite sides of the conveying apparatus.

5. The imaging device by millimeter wave 3D holographic scanning according to claim 4, wherein the first millimeter wave transceiving module and the second millimeter wave transceiving module are arranged opposite to each other.

6. The imaging device by millimeter wave 3D holographic scanning according to claim 1, further comprising:
  a position sensor configured to sense a position of the object on the conveying apparatus.

7. The imaging device by millimeter wave 3D holographic scanning according to claim 6, further comprising:
  an indicating apparatus configured to issue an indication when it is determined that a distance of the object toward a millimeter wave transceiving module is less than a predetermined value, and issue an indication when it is determined that the distance of the object apart from the millimeter wave transceiving module is more than a predetermined value, based on a sensing result of the position sensor.

8. The imaging device by millimeter wave 3D holographic scanning according to claim 1, wherein the scanning performed by the millimeter wave transceiving module is planar scanning.

9. The imaging device by millimeter wave 3D holographic scanning according to claim 1, further comprising:
  a data processing apparatus configured to receive scanned data from the millimeter wave transceiving module and generate a millimeter wave holographic image; and
  a display apparatus configured to display the millimeter wave holographic image generated by the data processing apparatus.

10. The imaging device by millimeter wave 3D holographic scanning according to claim 9, wherein the millimeter wave transceiving module is configured to transmit the obtained scanned data to the data processing apparatus in real time, or transmit the obtained scanned data in segments to the data processing apparatus after being buffered, or transmit the obtained scanned data to the data processing apparatus in one time after being buffered.

11. An imaging method of performing millimeter wave three-dimension 3D holographic scanning on an object to be inspected, comprising:
  conveying the object in a first direction by a conveying apparatus, so that the object passes through at least one millimeter wave transceiving module, wherein each millimeter wave transceiving module is arranged to have its longitudinal direction extend in a direction intersecting the first direction, and comprises a millimeter wave transceiving antenna array for transceiving millimeter wave signals;
  scanning the object by each millimeter wave transceiving module when the object passes through the millimeter wave transceiving module, so as to obtain scanned data of the object; and
  obtaining a millimeter wave holographic image of the object based on the scanned data,
  wherein the millimeter wave transceiving antenna array comprises a column of millimeter wave transmitting antennas and a column of millimeter wave receiving antennas, the two columns being arranged in parallel.

12. The method according to claim 11, wherein the millimeter wave transceiving module is arranged to be fixed when the object is being scanned.

13. The method according to claim 11, wherein the at least one millimeter wave transceiving module comprises a first millimeter wave transceiving module and a second millimeter wave transceiving module respectively arranged on opposite sides of the conveying apparatus.

14. The method according to claim 13, wherein the first millimeter wave transceiving module and the second millimeter wave transceiving module are arranged opposite to each other.

15. The method according to claim 11, further comprising:
- sensing a position of the object on the conveying apparatus; and
- issuing an indication when it is determined that a distance of the object toward a millimeter wave transceiving module is less than a predetermined value, and issuing an indication when it is determined that the distance of the object apart from the millimeter wave transceiving module is more than a predetermined value, based on a sensing result of a position sensor.

* * * * *